Dec. 22, 1925.  
C. W. KIRSCH  
CURTAIN FIXTURE  
Filed Feb. 28, 1924  
1,566,882
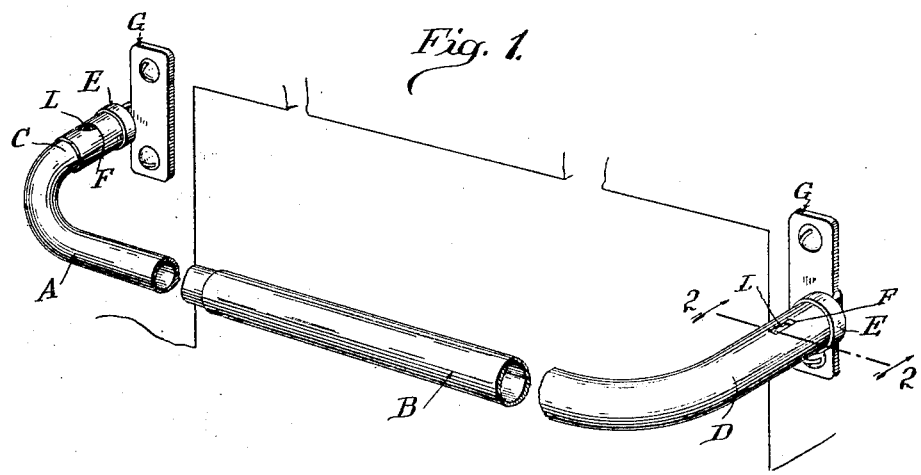
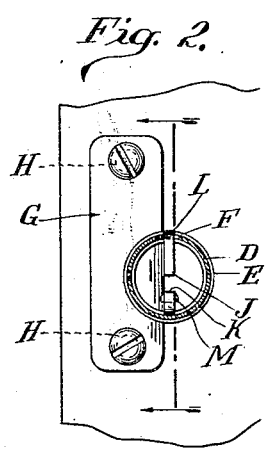
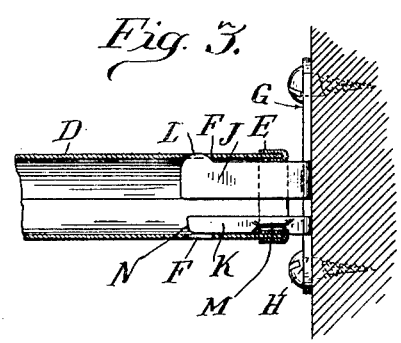
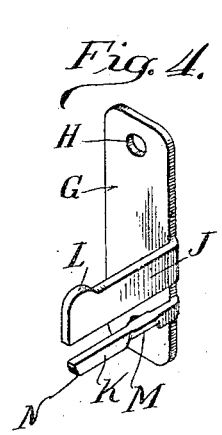
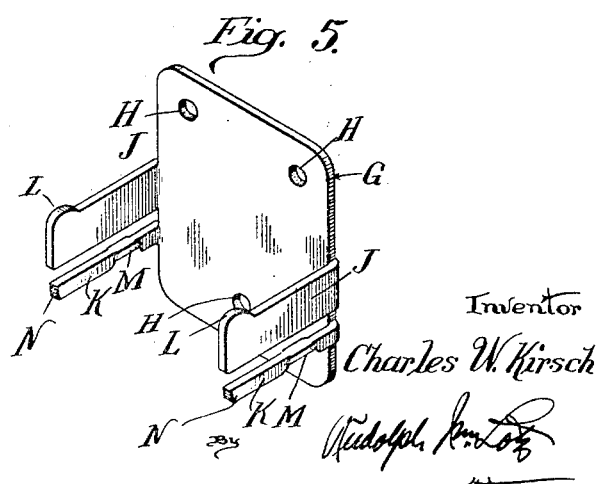
Inventor  
Charles W. Kirsch Patented Dec. 22, 1925.

1,566,882

UNITED STATES PATENT OFFICE.

CHARLES W. KIRSCH, OF STURGIS, MICHIGAN, ASSIGNOR TO KIRSCH MANUFACTURING COMPANY, OF STURGIS, MICHIGAN, A CORPORATION OF MICHIGAN.

CURTAIN FIXTURE.

Application filed February 28, 1924. Serial No. 695,696.

*To all whom it may concern:*

Be it known that I, CHARLES W. KIRSCH, a citizen of the United States, residing at Sturgis, in the county of St. Joseph and State of Michigan, have invented certain new and useful Improvements in Curtain Fixtures, of which the following is a specification.

This invention has for its object to provide a curtain-fixture including a curtain-rod and supporting brackets therefor, which are so detachably associated as to permit the brackets to be attached to and maintained in engagement with the rods prior to packing and shipping the fixtures, and which, when so associated, whether for shipping purposes or in use after the brackets have been mounted on the wall, as to firmly hold the rod in place on the brackets against accidental detachment, while permitting easy mounting and demounting of the rod without such resistance as would tend to cause accident to the user when performing such operation while standing on a chair, ladder or other elevated and unaccustomed support.

A further object of the invention is to provide a fixture of the character set forth which is exceedingly simple and cheap.

The invention is illustrated in the accompanying drawings in its adaptation to the type of cheap, light, telescopically extensible curtain-rods of cylindrical cross-section, commonly referred to as "round" as distinguished from that type practically C-shaped in cross-section, which is known as "flat," the invention being capable of adaptation for the "flat" type without changes other than dimensional.

In the said accompanying drawings:

Fig. 1 is a perspective view, partly in section, of a curtain-fixture constructed in accordance with the invention.

Fig. 2 is a transverse section of the same on the line 2—2 of Fig. 1.

Fig. 3 is a section on the line 3—3 of Fig. 2.

Figs. 4 and 5 are, respectively, perspective views of brackets for a single and for two parallel rods.

The rod, per se, comprises the male member A and female member B, each having one end portion C and D, respectively, extending substantially perpendicularly to the telescopically inter-engaged main portions thereof. The male member A being necessarily of smaller diameter than the member B, the free end portion of the arm C is annularly enlarged to correspond in diameter with the member B. In order to prevent opening or expansion of the free end portions of the arms C and D, the extreme ends thereof are provided with the ferrules E, the members A and B being usually made of very light butt-joint tubing. In the free end portions of said arms C and D and spaced from the extreme ends or the ferrules E thereof a distance less than the length of the annular enlarged or expanded portion of the arm C, are elongated perforations F in those diametrically opposed portions of the walls of said arms C and D which are, respectively, uppermost and lowermost when the rod is disposed in a horizontal plane.

Each of the supporting brackets comprises a wall-plate G having perforations H for the passage of fastening devices for mounting the same on a window-casing or the like, each of said wall-plates G being provided on one or both of its side edges with fingers J and K extending perpendicularly to the said plates. The finger J is, in each instance of greater depth than the finger K and constitutes a rigid as distinguished from a flexible element. It is provided at the outer end of its upper edge with a rounded projection L adapted to enter and engage in the upper perforation F of an arm of the rod.

The lower finger K is relatively narrow and very flexible. Between its ends it is flattened between its upper and lower edges to thereby provide a denser and, consequently, more resilient portion M between its ends, the degree of flexibility required necessitating the use of what is commonly known as "soft" stock, which is easily permanently bent or distorted. The purpose of the denser portion M is to retain the desired degree of flexibility without corresponding danger of permanent distortion of said finger K. The outer or free end of the latter is beveled as at N, to permit ready entrance of both said flanges into the open end of a rod-element C or D.

The straight portion of the upper edge of the finger J is spaced from the lower edge of the finger K a distance equal to the diameter of the end portion of the rod element C or D and the spacing of the projection L from the plate G is equal to the spacing of the perforations F from the extreme ends of the arms C and D, so that when said extreme ends abut against the plates G, the projections L will be engaged in the upper perforations F to retain the rods in the last-named positions.

During the passage of the fingers J and K into the end of an arm C or D, and until the projection L engages in a perforation F, the finger J will be flexed. Upon resuming its normal position it serves to retain the rod in relatively firm engagement with the bracket, so that only a pull on the arm or arms away from the plate or plates G will effect detachment of the rod from its brackets. By reason of the curvature of the projection L and the resiliency of the finger K, a very light pull on an arm of the rod will effect its detachment from the bracket without effecting a jerky or sudden release such as would tend to throw a person poised on a chair or ladder, off balance.

The purpose of the perforation F in both the upper and lower wall-portions is to render the arms C and D interchangeably engageable with the respective brackets.

The "double" type of bracket shown in Fig. 5 is adapted for supporting two parallel rods, the inner of which has shorter arms C and D than the outer rod, this type of fixture being illustrated in numerous prior patents.

Obviously, the construction is such that the fingers J and K will firmly hold the wall-plates G on the rod prior to mounting said plates on the window-casing, it being desirable to ship the fixtures in assembled form for better understanding of purchasers, these cheap round rods being sold mainly to the more or less ignorant class and foreigners who cannot readily comprehend printed instructions or illustrations. A further purpose of assembly at the factory is for the convenience of the retail merchant who, generally, disposes a large number of the rods on the counter and who does not care to be bothered with explanations or the task of assembling the rods and brackets.

I claim as my invention:

1. In combination, a hollow curtain rod having an opening adjacent one end, a constriction within said end, and a wall bracket having two fingers adapted to extend into said rod, one having an extension adapted to engage said opening in the rod, the other finger having a depression on its lower edge adapted to engage said constriction.

2. In combination, a hollow curtain rod having an opening adjacent one end, a ferrule within said end, and a wall bracket having two fingers adapted to extend into said rod, one having an extension adapted to engage said opening in the rod, the other finger having a depression on its lower edge adapted to engage said ferrule.

CHARLES W. KIRSCH.